United States Patent [19]
Shaffer et al.

[11] 3,826,602
[45] July 30, 1974

[54] FLEXIBLE ADAPTER FOR CONVEYING MATERIAL FROM EXTRUDER TO DIE

[75] Inventors: Ronald L. Shaffer, Downingtown; Frederic P. Stambaugh, West Chester, both of Pa.

[73] Assignee: Beloit Corporation, Beloit, Wis.

[22] Filed: Sept. 29, 1972

[21] Appl. No.: 293,440

[52] U.S. Cl. .................... 425/378, 425/447
[51] Int. Cl. ............................ B29f 3/08
[58] Field of Search .............. 425/243, 378, 447; 264/167

[56] References Cited
UNITED STATES PATENTS

| | | | |
|---|---|---|---|
| 2,587,930 | 3/1952 | Uschmann | 425/378 X |
| 3,111,715 | 11/1963 | Hofer | 264/167 |
| 3,314,109 | 4/1967 | Barton et al. | 425/380 X |
| 3,619,329 | 11/1971 | Wright | 425/379 X |

*Primary Examiner*—R. Spencer Annear
*Attorney, Agent, or Firm*—Dirk J. Veneman; Bruce L. Samlan; Gerald A. Mathews

[57] ABSTRACT

A flexible conduit secured to the outlet of an extruder, the opposite end of said conduit being fastened to a die. Heating means encompass the conduit to maintain the material therein in a flowable condition. The flexible conduit allows relative movement between the die and the extruder.

8 Claims, 3 Drawing Figures

FLEXIBLE ADAPTER FOR CONVEYING MATERIAL FROM EXTRUDER TO DIE

BACKGROUND OF THE INVENTION

The following relates to extrusion equipment and more specifically to a means for conveying extrudible plastic material from an extruder to a die.

For many years, a problem that has plagued the plastic extrusion industry is the inability to move the die structure relative to the extruder. Present extruder and die combinations must be movable in a horizontal cross machine direction (relative to the extruded film) from a first position to a second position such that the die structure can be properly positioned relative to other machines in a film casting line such as coating machines to coat webs, electrostatic treaters, unwinders and the like. Extruder and die combinations are extremely large and very heavy, for example, the structure may be ten feet high and weigh 60,000 lbs. Large and expensive machinery is necessary to move the extruder and die attached thereto in a cross machine direction and it is a cumbersome and timely operation. Although the expense is considerable and accurately positioning the die relative to the other line machinery is difficult, no suitable substitute has been commercially available to provide an alternate structure for moving the extruder and die relative to the other line equipment. The present adapters are expensive to manufacture since they are fabricated and custom fit and must design for heat expansion and contraction thereof.

One prior art structure that has been unsuccessfully attempted was a scissors type arrangement whereby the outlet end of the extruder was connected to the inlet end of the die structure by the scissors type arrangement to allow plastic material to flow therethrough and yet allowed the die structure to move independently of the extruder. But because of the severe leakage problems, there were no successful commercial embodiments of this type of structure.

It has been suggested that other suitable types of flexible connections may be utilized between the extruder end and die as far back as 1961 (see *Paper Film and Foil Converter*, page 35, September, 1961). See also U.S. Pat. Nos. 3,205,536 and 3,599,282 which diagrammatically illustrate some type of pressure hose between the material supply means and the extruder. However, the problems facing those who attempted to move the die relative to the extruder were that the means to convey the plasticized material therebetween must enable proper purging of the system without contamination when switching from one material to another, yet be strong enough to withstand the pressure under high temperature resulting from the plasticized material moving from the extruder to the die, and still finally being able to be flexible enough to allow movement therebetween. Furthermore, proper heating structures must be utilized to maintain the plastic in fluid form within the adapter and not limit the flexible movement.

It would be highly desirable then to devise an adapter between the extruder and the die to allow movement of the die relative to the extruder and thus substantially reduce the size of the moving means necessary to move the die over the finishing line equipment. It is further desirable that said adapter be capable of purging so that there would be no contamination on running of subsequent materials. It would further be desirable that said adapter be capable of sustaining the high pressures and temperatures from the extrudible material passing therethrough and have heating means to maintain the extrudible material in fluid form while not limiting movement of the die relative to the extruder.

SUMMARY OF THE INVENTION

An adapter structure for connecting the output of an extruder to the input of a die structure. The adapter structure is a flexible type of conduit and it is of sufficient strength to withstand the high pressure and temperature from the plasticized material. Heating means encompass the flexible conduit structure, the heating means allowing movement of the conduit between the extruder and the die without limiting movement of the conduit. The conduit structure is of serpentine shape and is coiled in the retracted position and elongated in the extended position, the conduit structure permitting flow of plasticized material therethrough without collecting within the conduit.

This flexible conduit structure eliminates the previously expensive design in engineering and fabrication costs of the previous type of rigid adapters. It further eliminates the need for a motorized extruder carriage basis for positioning the die relative to the other line equipment. Furthermore, this flexible adapter allows several extruders to be located in a general machine area which is not presently possible with standard adapters due to limitation in the size relationship of extruders and dies. The overall result is a more flexible extruder and die combination at substantially reduced prices.

One further advantage is that in the previous type of adapters, very expensive cast type heaters were used. In the present structure a heating coil encompasses the flexible conduit, thereby eliminating the cast type heaters.

DESCRIPTION OF THE PREFERRED EMBODIMENT

Figure 1:
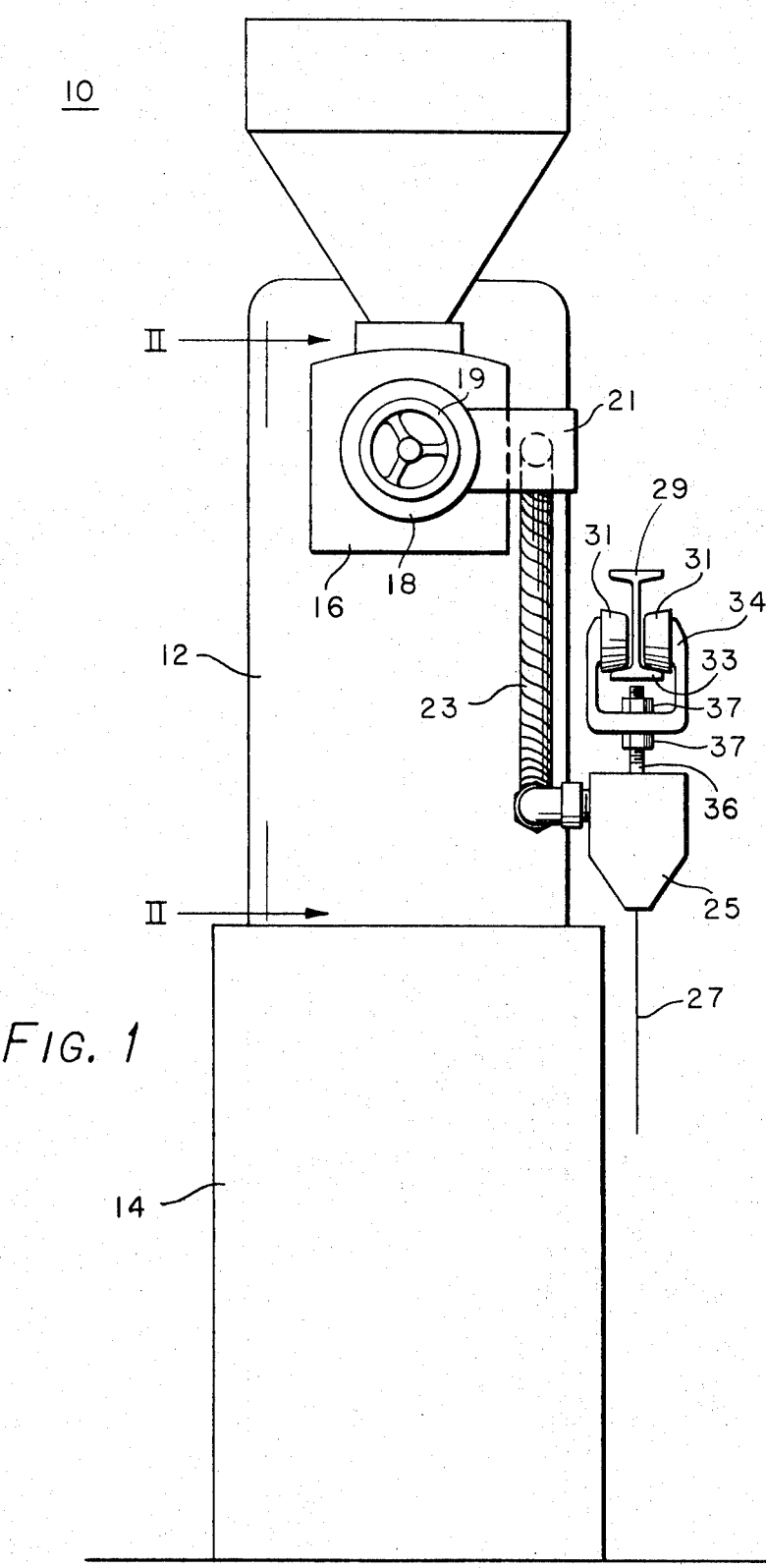
FIG. 1 is a simplified front elevational view of an extruder and die combination having an adapter built in accordance with the principles of the present invention.
Figure 2:
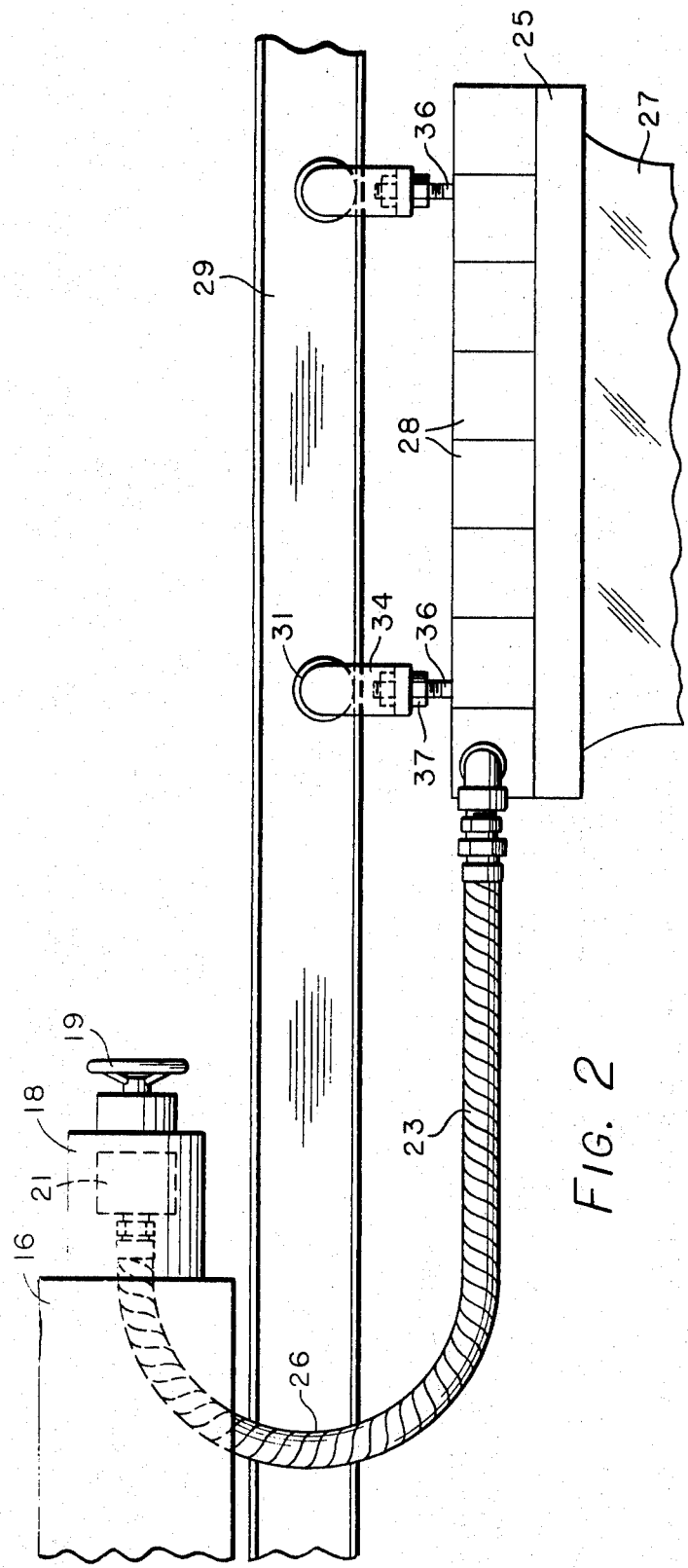
FIG. 2 is a side view taken along substantially 2—2 in FIG. 1.

Referring to the drawings in general and specifically to FIG. 1, there are shown a structure for producing a plastic melt generally designated by the numeral 10. The melt producing machine 10 comprises an extruder 12 being supported on a suitable base 14. The extruder includes a barrel portion 16 (FIG. 2). At the output end of the extruder barrel portion 16 is an extruder valve 18. The valve 18 may preferably be of the type shown in Cameron U.S. Pat. No. 3,307,217 assigned to the same assignee as the present invention. The handwheel 19 is utilized to regulate the flow and pressure of the plastic going through the valve 18.

Attached to the exit of the valve 18 is a rigid adapter portion 21. Secured to the outlet of the rigid adapter portion 21 is a flexible conduit 23. The outlet end of the conduit 23 is secured to a die structure 25. Although FIGS. 1 and 2 show the conduit being secured to an end portion of the die 25, it can also be secured to the center or top portions, respectively. The conduit 23 is of serpentine shape and has a coiled portion 26 which coiled portion moves horizontally depending on the position of the die 25.

Figure 3:
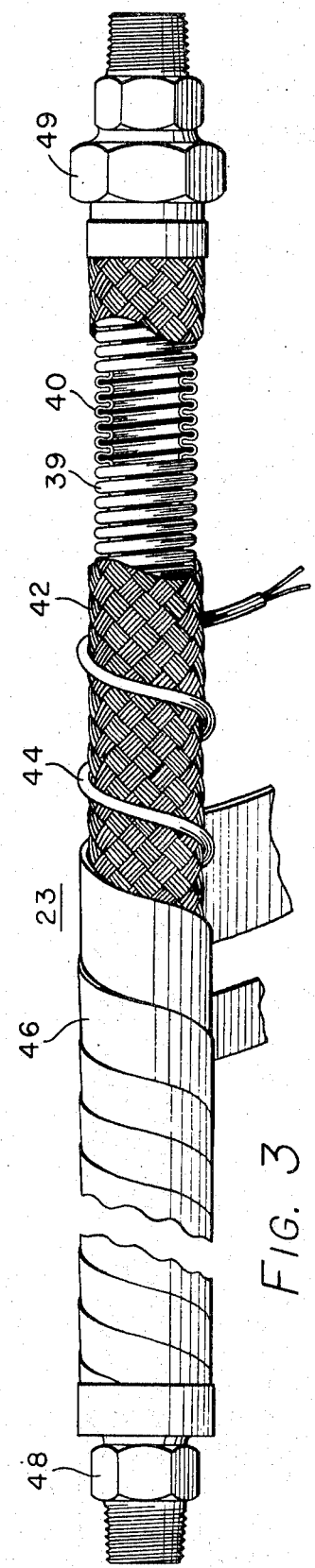
FIG. 3 is an enlarged view with portions cut away of the flexible conduit structure.

As shown in FIGS. 1 and 3, a single cast film sheet 27 is shown being extruded from the die 25. A plurality of heater bands 28 (FIG. 2) are provided along the length of the die to maintain the melt temperature as it passes through the die.

A monorail or I-beam 29 is provided to movably support the die 25 in a cross machine direction. The I-beam 29 may be supported from the extruder base (not shown) or from any other suitable carriage portion. A rotatable bearing portion 31 is movable in a cross machine direction on the top portion of the bottom flange 33 of the I-beam 29. The bearings 31 are supported on a U-shaped housing member 34 and are trapped by the combination of the bearings 31 and housing 34.

There is also provided a plurality of adjustable screw members 36 and corresponding lock nut members 37 to provide support for the die structure 25 and also enable adjustment in the vertical machine direction to adjust the height of the die relative to other suitable line equipment (not shown).

Referring more specifically to the flexible conduit 23, as shown in FIG. 3, the conduit includes a seamed flexible inner core 39, which has been formed by a plurality of annular and/or spiral corrugations 40. A braided material 42 encompasses the inner core which allows for flexibility and added strength for protection at high pressure. Wrapped around the braided portion 42 is an electrical resistance wire 44 which may be connected to any suitable electrical source (not shown) to provide sufficient heating of the plastic melt as it flows through the flexible conduit 23.

Encompassing the braided portion 42 and electrical wire 44 is an insulation wrapper 46 which is, as shown, wrapped in overlapping relation to also allow for flexibility in the overall conduit 23. Suitable fittings 48 and 49 are secured to opposite ends of the conduit 23 to provide the proper connection to the adapter portion 21 and die structure 25.

The flexible conduit 23, including the inner core 39 and braided portion 42, is commercially available as for example a Titeflex seamed stainless hose No. S88. The properties of this type of flexible conduit are that it has a burst strength at 70° F. of 4,000 PSI, a burst strength at 700° F. of 2,800 PSI, at 70° F. an operating pressure of 1,500 PSI, and at 700° F. is able to withstand an operating pressure of 1,000 PSI. The inner core is made of stainless steel and the braided portion is also made of stainless steel wire. Other suitable types of flexible conduits may be utilized.

Laboratory tests were run on an extruder to determine:
(a) if the flexible conduit was capable of withstanding the temperatures and pressures required in extruding material from the extruder to the die, (b) if the die could move in a cross machine direction from a first to a second position and perform substantially the same, and (c) if the corrugations would provide hang-up areas which would contaminate the film when one material was changed to another.

A laboratory test was run under the following conditions: (a) a 45 minute time interval, (b) extruder speed between 0 RPM and 125 RPM; (c) valve pressure between 200 PSI and 2,300 PSI, (d) plastic material commercially available as USI No. NA205; and (e) melt temperature of between 540° and 510° F. The test indicated that the material adequately flowed from the extruder through the valve to the die, and that the flexible conduit was able to withstand the temperature and pressure conditions exerted thereon.

A second test was then conducted under similar conditions to the first test whereby the flexible conduit and die was moved along the rail 29 into subsequent positions in the horizontal crows machine direction. Results showed that almost identical results were observed indicating that the flexible conduit 23 provided sufficient flexibility to allow movement of the die relative to the extruder and extruder valve and still supply sufficient melt to the die to be extruded therefrom. The test also indicated that the heating element 44 provided sufficient heat to the conduit to maintain the plastic in a molten state and furthermore did not hinder movement in the cross machine direction.

Various other tests were then run with different melt temperatures and different materials which indicated the adequacy of the flexible conduit.

A final test was run to determine if the corrugated portions 40 of the inner core 39 would provide sufficient hang-up areas to prevent commerical utilization of this type of tube because of contamination of plastics between successive runs. Clear USI NA205 plastic material without color additives was introduced and extruded through the extruder and flexible conduit. Then black color additive was introduced into the USI NA205 resin until a deep full black color was flowing from the flexible conduit. Clear resin was again run through the extruder to purge the color additives from the machine with an approximate purge time of 45 minutes. The machine was shut down and the flexible adapter was removed and cut in half to check for deposit of black resin in the adapter. A visual inspection unexpectedly revealed that no black color resin was deposited within the corrugated portions 40 of the flexible conduit 23.

The testing showed that a flexible type of conduit is strong enough to withstand the combination of pressure and temperature conditions imposed upon it and yet further provide sufficient flexible movement between the extruder and the die structure. The insulation 46 and electrical heating wire 44 which is secured to the conduit 23 did not limit movement of the flexible conduit. The heating wire 44 and insulation 46 further provides sufficient heating to maintain the plastic melt flowing through the flexible conduit 23. Furthermore, the tests indicated that no significant hang-up areas or contamination areas occurred within the convoluted portion 40 of the flexible conduit 23.

What is shown then is a combination of an extruder and die portion connected by a flexible conduit 23. The motorized extruder bases which are presently utilized can be eliminated with corresponding savings in both money and space. The conduit is provided with heating means which does not limit the relative movement between the extruder and the die. With the addition of a monorail support structure, very simple and adequate positioning of the die can now be maintained relative to the other line equipment.

We claim:

1. In a structure for producing plastic melt, said structure including an extruder, a die, and a conduit structure connecting said extruder and die, the improvement comprising in combination:
   heating means in close proximity to said conduit,
   said heating means being adapted to heat said conduit and allow for movement of said conduit between said extruder and die,
   said conduit being flexible and allowing movement of said die relative to said extruder,
   said conduit structure permitting flow of plasticized material therethrough without collecting within said conduit,
   said flexible conduit structure including an inner core, and an outer core surrounding the inner core for strength, and
   said inner core including a member having a plurality of corrugations.

2. The structure recited in claim 1 and further including insulation means surrounding the heating means to minimize heat losses from the heating means.

3. The structure recited in claim 1 wherein the heating means comprises an electrical wire structure encompassing the conduit structure.

4. The structure recited in claim 1 wherein the outer core is of a braided material which allows flexibility in addition to the strength.

5. The structure recited in claim 1 wherein the heating means includes an electrical wire wrapped around the inner and outer cores in close relation therewith and a power source to provide electrical current to said wire.

6. The structure recited in claim 1 and further including a rail structure extending in a cross machine direction,
   a housing member supported from said rail structure and,
   means to adjustably fasten the die to the housing member.

7. In a structure for producing plastic melt, said structure comprising a base portion supporting an extruder, die, and adapter means, said adapter means fluidily connecting said extruder and die, the improvement comprising:
   said adapter means being comprised of a member having a plurality of corrugations therein, said plurality of members being flexible and allowing movement of the die relative to the extruder in a cross machine direction,
   heating means surrounding said adapter means, said heating means being flexible and allowing for movement of said adapter means in a horizontal direction,
   said heating means maintaining the temperature of the plastic melt within the adapter means to help prevent suspension of the plastic melt particles within the corrugations and enabling the adapter to be purged.

8. The structure recited in claim 7 wherein the adapter means includes a convoluted inner core and braided outer core.

* * * * *